Patented Feb. 28, 1939

2,148,441

UNITED STATES PATENT OFFICE 2,148,441

CYANINE DYES DERIVED FROM 2-METHYL-THIAZOLE DERIVATIVES

George A. Dawson, North Brunswick Township, Middlesex County, and Edmund B. Middleton, Parlin, N. J., assignors to Du Pont Film Manufacturing Corporation, New York, N. Y., a corporation of Delaware No Drawing. Original application March 25, 1932, Serial No. 601,290. Divided and this application January 30, 1934, Serial No. 709,048

3 Claims. (Cl. 260—240)

This application is a division of our co-pending application Serial No. 601,290 filed March 25, 1932, which claims photographic elements containing the dyes herein described.

Our present invention relates to a new composition of matter, more particularly to cyanine dyes, and one of its objects is to provide a dye capable of imparting improved and selective color sensitization to photographic emulsions. Another object is to extend with relative uniformity the sensitivity of the emulsion to light in a wide range of the longer wave lengths, especially to those wave lengths in the vicinity of the red and green regions of the spectrum. Other objects will plainly appear from the detailed description presented herein.

To enable those skilled in the art to use our invention, we will as an illustration describe its preferred embodiment with the understanding that modifications may be presented without departing from its broader spirit and scope.

To efficiently intensify the speed and color sensitivity of an emulsion to light in the above described portions of the spectrum, we have discovered a type of novel cyanine dyes derived from certain thiazole bases represented diagrammatically by the following general formula:

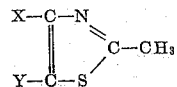

wherein X and Y are used to designate substituents.

Preferred thiazole bases from which our novel type of cyanine dyes is derived, are those bases obtained by varying the groups in the four and five positions of the aforementioned general formula. We are thereby afforded bases represented by the following formulae:

*I*

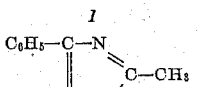

*II*

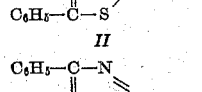

*III*

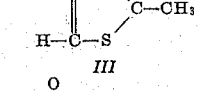

wherein R represents any alkyl group, or substituted alkyl group.

*IV*

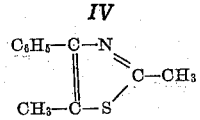

Such preferred methyl thiazole bases as designated above are all preferably made by condensing halogen substituted aldehydes, ketones, or halogen substituted ketonic esters with thioamides. For example, the thiazole in Formula I (2-methyl-4,5-diphenyl thiazole) may be made by condensing $C_6H_5$—CHBr—CO—$C_6H_5$ with thioacetamide. These bases are well known and have been described in the prior art, particularly by Hubacher in Annalen, No. 259, page 244, and by Hantzch in Annalen, No. 250, page 269.

As will be further shown, our dyes are derived as a result of substituting a methyl group in the two position of the aforementioned formula, in addition to varying therein the groups in the four and five positions.

In general we prefer to make our novel dyes by first converting the above mentioned methyl thiazole bases to quaternary compounds, preferably by heating them with ethyl iodide or ethyl p-toluene-sulphonate. These quaternary compounds may then be converted to novel cyanine dyes which will be grouped and described in the three following correlated examples: (A) Thiocarbocyanines, (B) Pseudocyanines, (C) Dyes related to isocyanines.

To further explain our invention we will describe various preferred illustrations in each of the aforementioned examples of dyes made from our herein described thiazole bases, first using Base I (diphenyl-methyl-thiazole), although the related bases II, III, or IV, may be used whenever described.

In the following formulae for our novel cyanine dyes given under Examples A, B, C, we use R to represent any alkyl or substituted alkyl group and X to represent a suitable acid radicle such as the iodide radicle or the para-toluene-sulphonate radicle.

Example A.—Thiocarbocyanines

One of the preferred thiocarbocyanines is derived from Base I in the following manner: The ethiodide of 2-methyl-4,5-diphenyl thiazole is preferably heated in pyridine solution with a small amount of ethyl orthoformate. The dye forms and on cooling it precipitates. It is then filtered and is recrystallized from alcohol. It is then dissolved in alcohol, and subsequently added to the photographic emulsion.

More specifically, this preferred thiocarbocyanine is derived from Base I in the following manner: Two grams of the ethiodide of 2-methyl-4,5-diphenyl thiazole (or an equivalent amount of some other quaternary salt such as 2.2 grams of the p-toluene sulphonate) and 4 grams of ethyl orthoformate and 15 grams of dry pyridine, in a dry flask with a reflux condenser attached, are heated to boiling. The mixture is allowed to reflux for one hour. A blue dye gradually forms. The flask is allowed to stand overnight in a cool place, and the precipitated dye is filtered and washed with ether. It is then recrystallized from alcohol. This dye, added to the emulsion, confers an extra sensitivity to it, with a maximum between 615 and 620mu, and extending to 670. While the dye may be added at several points during the manufacture of the emulsion, the following example will illustrate one method of sensitizing: One tenth of a gram of dye is dissolved in 100 cc. of alcohol and this solution is added slowly, with stirring, to the melted emulsion. This is then coated as usual. The dye is represented by the following formula:

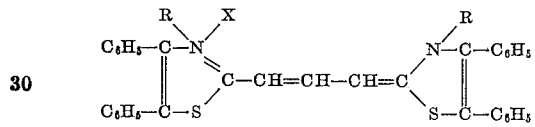

Other novel thiocarbocyanine dyes may be derived from thiazole Base Number II. One of such dyes is the ethiodide, and is represented by the following formula:

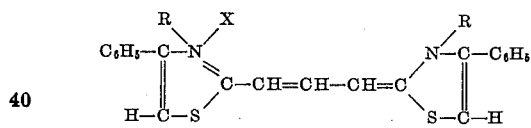

This dye may be made exactly like the dye described in Example A except that instead of 2 grams of the ethiodide of Base I, one uses 1.6 grams of the ethiodide of Base II. The resulting dye confers an extra sensitivity to the emulsion when added to it as described in Example A, except that the sensitivity has a maximum at approximately 590 and extends to 650.

In a like manner, by employing the herein described thiazole Base III, we derive additional and novel thiocarbocyanine dyes, among which is the dye represented by the following formula:

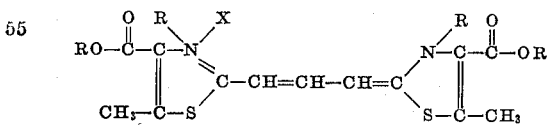

For example, if, in Example A, one uses instead of 2 grams of the ethiodide of Base I, an equivalent amount of the ethiodide of Base III, one obtains a blue dye which confers a moderate extra sensitivity to the emulsion, with maximum at 580 and extending to 630.

An additional and novel thiocarbocyanine dye may be derived in a like manner from Base IV in the following manner: The ethiodide of 2-methyl 4 phenyl 5 methyl, thiazole is added in pyridine solution with a small amount of ethyl orthoformate. The dye forms and on cooling and diluting with ether it precipitates. It is purified by recrystallization from alcohol. It is then dissolved in alcohol and a small amount of the dye is added to a photographic emulsion, preferably at some time before the emulsion is coated on its support. This will provide the emulsion with a greatly increased sensitivity reaching a maximum at 600mu. This dye is represented by the following formula:

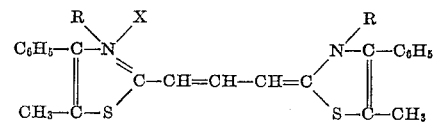

For example, in Example A, if one uses instead of the ethiodide of Base I, an equivalent amount of the ethiodide of Base IV, one obtains a blue dye which confers an extra sensitivity to a photographic gelatino-silver halide emulsion, with maximum at approximately 595 and extending to 620.

*Example B.—Pseudocyanines*

One of our prefered pseudocyanines is derived from Base I in the following manner: The ethiodide of 2-methyl-4,5-diphenyl thiazole and alphaiodoquinoline ethiodide are suspended in absolute alcohol and treated with alkali. The resulting red dye is purified by recrystallization from alcohol. This dye when added to the emulsion, will provide the emulsion with a greatly increased sensitivity reaching a maximum at 540mu. More specifically, this preparation may be described as follows: Two grams of the ethiodide of 2-methyl-4,5-diphenyl thiazole and 2 grams of alphaiodiquinoline ethiodide are suspended in 50 cc. of boiling absolute alcohol and treated with .55 grams of potassium hydroxide dissolved in absolute alcohol. Boiling is continued for fifteen minutes, and a red dye gradually forms. On cooling, it crystallizes. It may be recrystallized from alcohol. This dye may be represented by the following formula:

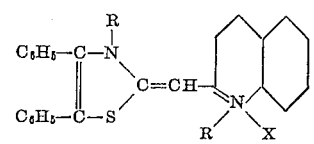

or by the formula:

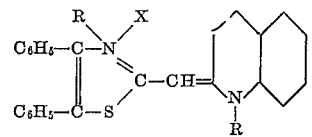

either designation indicating the same dye because the position of the acid radical is uncertain. The formula might also be written:

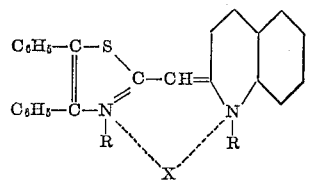

indicating that the acid radical is in a state of equilibrium between the two nitrogen atoms of the heterocyclic nuclei. The same is true of the other structural formulas of the dyes herein described.

Another novel pseudocyanine dye that efficiently acts to definitely shift the maximum of extra sensitivity towards the red, is derived from Base I by using alphaiodonapthoquinoline ethiodide instead of the alphaiodoquinoline ethiodide described above. This dye is represented by the following formula:

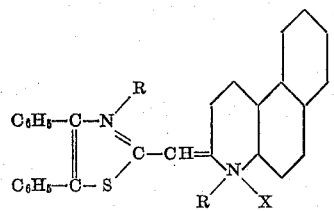

*Example C.—Dyes related to isocyanines*

One of our preferred dyes under this heading is derived from Base I in the following manner: The ethiodide of 2-methyl-4,5-diphenyl thiazole and quinoline ethiodide are dissolved in alcohol and treated with alkali. The resulting red dye is purified by recrystallization. When added to a photographic emulsion, this dye uniformly extends the normal sensitivity of the emulsion far into the green region of the spectrum. More specifically, this procedure may be described as follows: Two grams of the ethiodide of 2-methyl-4,5-diphenyl thiazole and 1.4 grams of quinoline ethiodide are dissolved in 50 cc. of boiling alcohol and treated with .28 gram of potassium hydroxide dissolved in alcohol. The mixture is maintained at the boiling point for fifteen minutes, and a red dye is formed. It may be purified by recrystallization from alcohol. This dye is represented by the following formula:

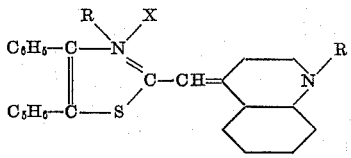

We have found that our invention has provided a type of novel cyanine dyes that has enabled us to obtain greatly improved color balance in the ultimate image, by the incorporation of one or more of our dyes in a photographic emulsion. These dyes act with marked efficiency to uniformly and selectively extend the sensitivity of prior panchromatic emulsions to light in a wide range of the longer wave lengths, especially in the vicinity of the red and green regions of the spectrum, without conferring any abrupt or over emphasized increase of the sensitivity in any relatively restricted region of the spectrum that would tend to distort or destroy the desired color balance in the final photographic image.

Numerous dyes that are the allied or related equivalents of those disclosed herein may be used without departing from our invention and it is clearly contemplated that such equivalents, or modifications thereof, as well as the use of such dyes as sensitizers for photographic emulsions, fall within the intent and scope of the appended claims.

What we claim as our invention and desire to be secured by Letters Patent of the United States is:

1. A thiopseudocyanine dye having the following general formula:

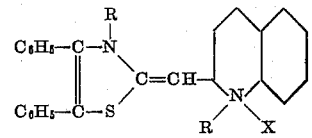

in which R represents alkyl, and X is a halogen atom.

2. A methine cyanine dye having the following general formula:

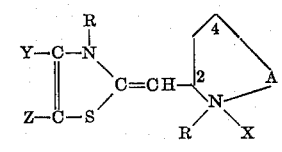

wherein both Y and Z represent benzene nuclei, R represents alkyl, X represents the negative radical of an acid, A represents a radical selected from the group consisting of phenylene and naphthylene, and the methine carbon atom is linked in one of the 2- and 4-positions.

3. A thiopseudocyanine dye having the following general formula:

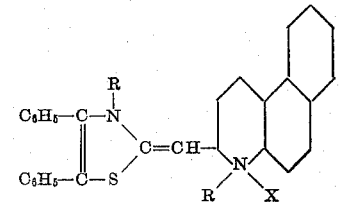

where R represents alkyl and X represents a halogen atom.

GEORGE A. DAWSON.
EDMUND B. MIDDLETON.